United States Patent [19]

Zievers et al.

[11] 4,452,707
[45] Jun. 5, 1984

[54] PROCESS FOR MANUFACTURING A FILTER AID

[75] Inventors: James F. Zievers, LaGrange; Paul Eggerstedt, Lyons, both of Ill.

[73] Assignee: Industrial Filter & Pump Manufacturing Co., Cicero, Ill.

[21] Appl. No.: 427,846

[22] Filed: Sep. 29, 1982

[51] Int. Cl.³ .............................................. B01D 37/02
[52] U.S. Cl. ...................................... 210/777; 201/17; 208/8 LE; 210/503
[58] Field of Search ........................ 208/8 LE; 201/17; 210/768, 771, 772, 777, 778, 193, 503

[56] References Cited

U.S. PATENT DOCUMENTS

| | | | |
|---|---|---|---|
| 3,284,320 | 11/1966 | Fannin et al. | 203/84 X |
| 4,157,305 | 6/1979 | Muller | 210/771 |
| 4,260,485 | 4/1981 | Carr et al. | 208/8 LE X |
| 4,301,015 | 11/1981 | Parsons et al. | 210/777 |

Primary Examiner—Charles N. Hart
Assistant Examiner—W. Gary Jones
Attorney, Agent, or Firm—Edmond T. Patnaude

[57] ABSTRACT

In the extraction of coal the liquid coal extract is filtered using a filter aid produced by washing the filter cake with a low viscosity, high boiling point, low vapor pressure ester and then calcining the cake to remove the wash solvent and other combustible constituents from the cake.

16 Claims, 1 Drawing Figure

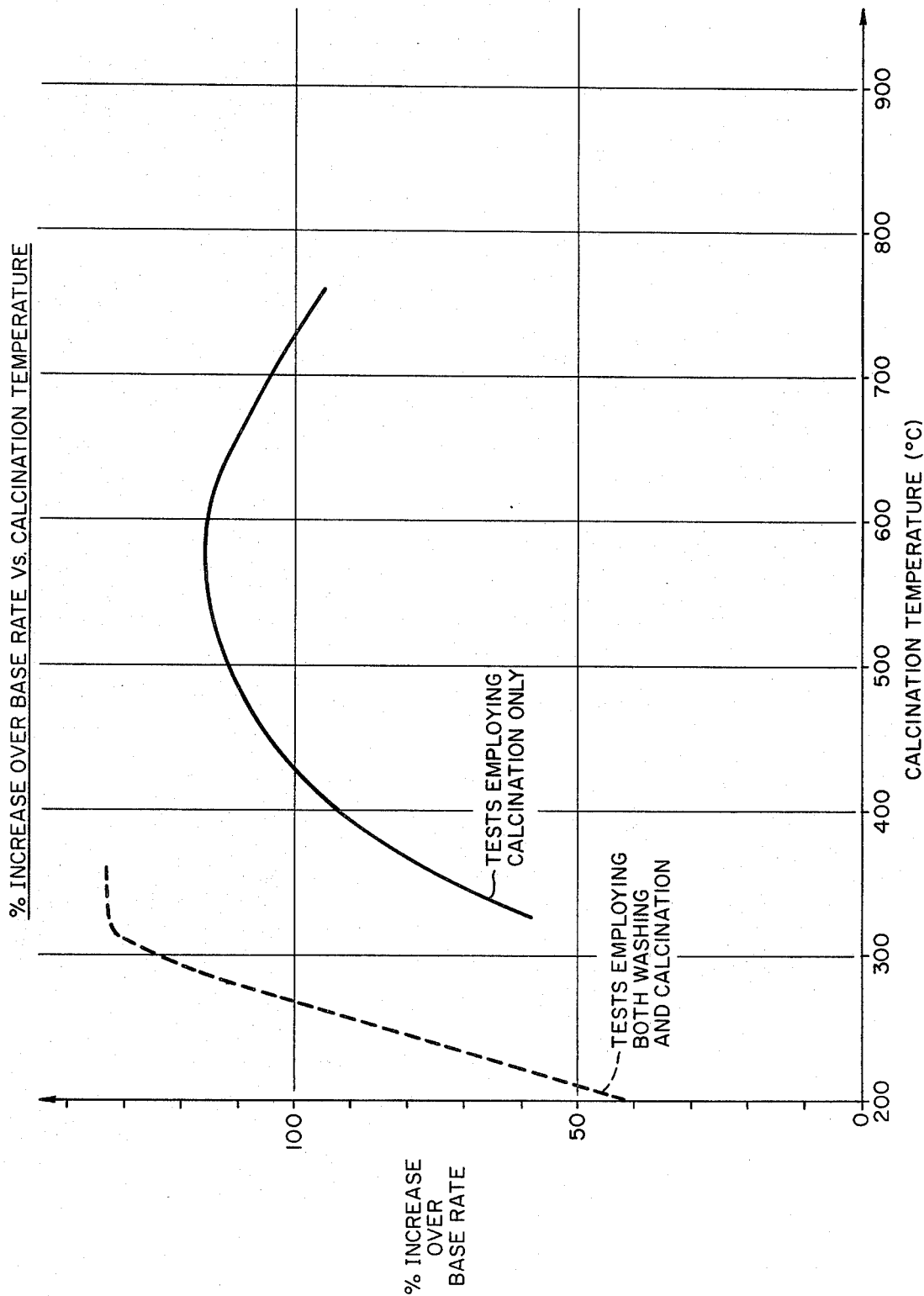

PROCESS FOR MANUFACTURING A FILTER AID

The present invention relates in general to the manufacture of filter aid from filter cake produced during the filtration of coal extracted with the use of liquid solvents, and it relates to the use of such filter aid in the filtration of coal extract.

BACKGROUND OF THE INVENTION

The use of a high boiling point volatile solvent for extracting coal is well known. The resulting extract contains some undissolved coal as well as shale particulates and other matter. These entrained solids have heretofore been removed from the liquid extract by passing the extract through a filter, and improved filtration has been achieved by the use of filter aids both as a precoat and as a body feed. Conventional filter aids, such as diatomaceous earth, have been successfully used for this purpose, but the cost of the filter aid is high and subsequent disposal of the used filter aid presents serious economic and ecological problems.

U.S. Pat. No. 4,301,015 describes a coal extraction process using a filter aid derived from the filter cake produced during the filtration of the coal extract. In accordance with the process described in this patent the filter cake is removed from the filtration apparatus and pelletized. The filter cake pellets are then heat treated in the presence of oxygen at temperatures in the range of 600° C. to 950° C., to calcine the pellets. The calcined pellets are then broken up into small particles and subsequently used as a filter aid in the coal extraction process. An optional process step described in this patent is to preheat the pellets to a temperature of about 400° C. to drive off the coal extraction solvent prior to the high temperature calcination step.

SUMMARY OF THE INVENTION

Briefly, there is provided in accordance with the present invention a new and improved method of manufacturing a filter aid from the filter cake produced in a liquid coal extraction process, and there is also provided a method of using this filter aid in a liquid coal extraction process. After completion of a filtration cycle wherein filter cake has built up on filter elements such as filter tubes or filter leaves, the cake is washed by flowing a low viscosity, high boiling point liquid ester such as dibutyl phthalate through the filter cake to remove the coal extraction solvent from the cake. The cake in which the coal extraction solvent has been replaced with the liquid ester wash solvent is then removed from the filter elements, calcined at a relatively low temperature in the range of 280° C., to 400° C., and then ground or otherwise broken up to the desired particle size for subsequent use as a filter aid.

If desired, the calcination step can be eliminated, but the resulting filter aid will be less effective than when the washing step is followed by the calcination step.

As described more fully hereinafter, when the filter aid manufactured in accordance with the present invention is used in a liquid coal extraction process, it provides greatly improved flow rates as compared to the use of filter aid manufactured by simply calcining the filter cake in one or two steps at the relatively high temperatures described, for example, in U.S. Pat. No. 4,301,015. Moreover, the cost of manufacturing filter aid in accordance with this invention is relatively low since the high temperature calcining operation of the prior art is not required, and the ester solvent can be economically reclaimed and reused.

GENERAL DESCRIPTION OF THE DRAWING

The present invention will be better understood by a reading of the following detailed description taken in connection with the accompanying drawing wherein the single FIGURE is a graph showing the comparative flow rates obtained in coal extract filtration by using filter aids processed in accordance with the prior art method described in U.S. Pat. No. 4,301,015 and filter aids processed in accordance with the present invention.

DETAILED DESCRIPTION OF THE INVENTION

In practicing the present invention, the liquid coal extract containing the undissolved coal particles and particulate ash is passed through a filtration medium on which the coal and ash particles are deposited to form a porous filter cake. Ordinarily, the ash particles are primarily shale which is not completely separated from the coal prior to forming the coal extract. The filter cake also contains the high boiling point volatile solvent used in the extraction process. During the filtration process the liquid coal extract is ordinarily maintained at a temperature of about 204° C., wherefore the temperature of the filter cake is also at about 204° C., during the extraction process.

When the thickness of the filter cake reaches the point where the cake must be removed, the filter is taken off line and then, in accordance with the teachings of the present invention the coal extracting solvent is washed out of the filter cake using a low viscosity, high boiling point liquid ester having a low vapor pressure. Preferably the cake is washed while it remains on the filter elements by passing the wash solvent through the cake. Moreover, improved results are achieved by preheating the wash solvent to the temperature of the cake, i.e., about 204° C. In this manner the washing step can be carried out by passing the wash liquid through the cake before the filter tank is opened after the filtration cycle has been completed.

In accordance with one aspect of this invention the cake is then dried by passing an inert gas, such as nitrogen, through the cake, and the cake is then removed from the filter and milled or ground to the desired particle size for use as a filter aid. For example, a particle size of 75 microns provides a filter aid suitable for use as a body feed in a liquid coal extraction process. The use of this filter aid as a body feed has been found to provide an increase in flow rate through a filter of over forty percent as compared to filtration of the liquid coal extract without any body feed. Although the flow rates obtained by the use of filter aid produced in this manner are considerably less than those obtained by the use of the process described in the said patent, the initial cost of producing the filter aid in this manner is considerably less because there is no need for a calcining oven.

In accordance with another aspect of the invention, however, we have found that greatly augmented flow rates are obtained if the filter cake is calcined at relatively low temperatures after the washing step described hereinabove and small amounts thereof are used as body feed in a liquid coal extraction process.

The mechanism behind this phenomenon is not fully understood since it may be the result of a chemical reaction during the wash step, or it may be physical, or it may be a combination of both. In theory, the high temperature of the wash step favors increased solubility wherefore the wash solvent is capable of retaining more of the solute. In addition, the solute material has a reduced viscosity at the wash temperature whereby the liquid coal extract remaining in the cake is more easily flushed out of the cake by the hot wash solvent. However, we found that washing of the cake with quinoline, an aromatic solvent derived from coal tar, does not result in a satisfactory filter aid although both dibutyl phthalate and dimethyl phthalate provide good results, thereby suggesting that a chemical reaction may be involved.

COAL EXTRACT FILTRATION TEST PROCEDURE

The following filtration procedure was followed to produce filter aid in accordance with the present invention and to test the effectiveness of the filter aid so produced.

A 100 mL sample of liquid coal extract from Wilsonville, Ala. having an ash content of about 4% to 5% by weight and having a weight of 111.45 grams was preheated to a temperature in the range of 93° C., to 104° C., and subsequently heated in a filter to about 204° C., the usual temperature at which liquid coal extract is filtered.

The 100 mL sample of liquid coal extract was placed in a bench scale filter having a filter media consisting of one 24×110 Dutch weave screen and one M-12 screen positioned in face-to-face relationship one against the other. The filter and the sample were then heated to 204° C., and thereafter the filter chamber was pressurized to 100 p.s.i.g. with nitrogen gas to force the liquid coal extract through the filter media. The time required for 20 mL of the sample to pass through the cake was recorded and the time for the entire sample to pass through the cake was also recorded. The filtrate flowrate during this test provided the base flowrate, i.e., the flowrate when no filter aid was added to the sample.

The filter cake resulting from this test can be used as the base material for manufacturing filter aid in accordance with this invention.

FILTER CAKE WASHING PROCEDURE

While maintaining the filter and the filter cake at 204° C., the cake was washed with a liquid ester having a temperature of about 204° C., by flowing 50 mL of the ester through the cake. Liquid esters having a high boiling point, over 300° C.; a low viscosity, 0.3 poise; and a low vapor pressure, i.e., less than 1 m.m. of mercury at 25° C., were found to produce a satisfactory filter aid when subsequently treated as described below.

EXAMPLE 1

The washed filter cake obtained from the filtration and wash procedures described above was dried by the passage of the nitrogen gas therethrough, and the cake was then removed from the filter screens and broken up into particles having a size of 200 mesh or about 75 microns to provide a filter aid.

The above described filtration test procedure was then repeated using a 100 mL sample of liquid coal extract to which 4.3 grams of the filter aid was added and well mixed. The flowrate was found to increase by 41.8% over the base flowrate.

EXAMPLE 2

The washed filter cake obtained from the filtration and wash procedures described above was removed from the filter screens and placed in a crucible and inserted into a refractory oven having a temperature held constant to within 15° C., and open to the atmosphere. The oven temperature was 280° C. and the cake remained in the oven for 5 minutes. We found from other tests that the results did not change by any noticeable extent if the cake remained in the oven for longer periods of time.

The cake was thus calcined, and after removal from the oven and cooled to about room temperature the calcined cake was broken up into particles having a size of 200 mesh to provide a filter aid.

The above described filtration test procedure was then repeated using a 100 mL sample of liquid coal extract to which 4.3 grams of this filter aid was added and well mixed. The flowrate was found to increase by 111% over the base flowrate.

EXAMPLE 3

The procedure of Example 2 was repeated except that the washed cake was calcined at a temperature of 310° C. The flowrate increased to 133% over the base flowrate.

EXAMPLE 4

The procedure of Example 2 was again repeated except that the washed cake was calcined at a temperature of 380° C. The flowrate increased to 133% over the base flowrate.

In each of the above examples the wash solvent was dibutyl phthalate. Dimethyl phthalate and other high boiling point, low viscosity, low vapor pressure liquid esters can, however, also be used as the wash solvent in the production of filter aid in accordance with this invention.

The results of the above examples are plotted in the graph shown in the drawing. It may be seen that increasing the calcining step over 320° C., has no substantial effect on the flowrates attained using the resulting filter aid.

Also shown in the drawing is a graph of the flowrates obtained using filter aids produced from liquid coal extract filter cakes which were not washed with a liquid ester prior to calcination. It may be seen that the filter aid of the present invention not only results in higher flowrates, but is produced at considerably lower calcination temperatures. For example, an increase of about 120 percent flowrate over the base rate is obtained using filter aid produced in accordance with the prior art at calcination temperatures of about 550° C. On the other hand, an increase of 133 percent is achieved by using filter aid produced by the method of the present invention at a calcination temperature of about 320° C.

While the present invention has been described in connection with a particular embodiment thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed:

1. An improved method of filtering coal extract resulting from the extraction of coal with a liquid coal extraction solvent, including the use of a filter aid through which a solution of said coal extract and said coal extraction solvent is passed, wherein the improvement comprises using as the filter aid the product of a washed filter cake from the coal extraction process, said filter cake being washed prior to calcination with a low viscosity liquid ester having a boiling point greater than 300° C., and a vapor pressure less than one millimeter of mercury at 25° C., to remove said coal extraction solvent from said cake.

2. A method according to claim 1 wherein said ester is dibutyl phthalate.

3. A method according to claim 1 wherein said ester is dimethyl phthalate.

4. A method according to claim 1 wherein said step of washing is carried out at a temperature of at least about 200° C.

5. A method according to claim 1 wherein the cake is heated to a temperature of 280° C., or more after being washed.

6. A method according to claim 5 wherein the cake is maintained at a temperature of 280° C., or more for at least 5 minutes.

7. A method according to claim 1 wherein said cake is broken up onto small particles after being washed.

8. A method of making a filter aid, comprising the steps of
    filtering a liquid coal extract resulting from the extracting of coal with a volatile liquid solvent to provide a filter cake, and
    removing said volatiles from said filter cake prior to calcination by washing said filter cake with a low viscosity liquid ester having a boiling point greater than 300° C., and a vapor pressure less than one millimeter of mercury at 25° C.

9. A method according to claim 8 comprising the further step of
    calcining the washed filter cake at a temperature of at least 280° C., for about 5 minutes or more.

10. A method according to claim 8 wherein said liquid ester is dibutyl phthalate.

11. A method according to claim 8 wherein said liquid ester is dimethyl phthalate.

12. A method according to claim 8 wherein said cake is dried by passing nitrogen gas through the cake after the cake has been washed.

13. A method according to claim 8 wherein said liquid ester and said cake have a temperature of about 200° C., during the washing step.

14. A method of making a filter aid, comprising the steps of
    passing a liquid coal extract resulting from the extraction of coal with a volatile liquid solvent through a porous filter element to deposit a filter cake on said filter element;
    then flowing through said element and said filter cake a low viscosity liquid ester having a boiling point greater than 300° C., and a vapor pressure less than one millimeter of mercury at 25° C.,
    then removing said filter cake from said filter element and calcining the removed cake at a temperature of at least 280° C., for about five minutes or more.

15. A method according to claim 14 wherein
    said liquid ester is dibutyl phthalate.

16. A method according to claim 14 wherein
    said liquid ester is dimethyl phtalate.

* * * * *